United States Patent [19]

Merel et al.

[11] Patent Number: 5,050,894
[45] Date of Patent: Sep. 24, 1991

[54] SEALING DEVICE DESIGNED TO ACHIEVE SEALING BETWEEN TWO PARTS HAVING A POSSIBILITY OF RELATIVE ROTATION TO A LIMITED EXTENT

[75] Inventors: René Merel, 656 Matagual, Colombes, 92083; Michel Galard, Tacoignieres, both of France

[73] Assignee: EG & G, Maurepas, France

[21] Appl. No.: 466,532

[22] Filed: Jan. 17, 1990

[30] Foreign Application Priority Data

Jan. 19, 1989 [FR] France .................. 89 00598

[51] Int. Cl.⁵ .................. F16J 3/04; F16J 15/52
[52] U.S. Cl. .................. 277/182; 251/335.3; 277/189; 277/212 FB; 403/50; 464/174; 464/175
[58] Field of Search .......... 277/212 FB, 88, 89, 277/182, 189; 464/173, 174, 175; 403/50, 134, 288, 76, 50; 251/335.3

[56] References Cited

U.S. PATENT DOCUMENTS

| | | | |
|---|---|---|---|
| 3,063,266 | 11/1962 | Rabson | 464/174 |
| 3,082,795 | 3/1963 | Heller. | |
| 3,318,335 | 5/1967 | Heller. | |
| 3,515,394 | 6/1970 | Stevens | 277/88 |
| 3,897,070 | 7/1975 | Anderson et al. | 277/212 FB X |
| 4,107,952 | 8/1978 | Geisthoff | 464/125 |
| 4,163,563 | 8/1979 | Mullaney | 277/88 |
| 4,577,871 | 3/1986 | Weghaupt et al. | 277/212 FB X |

FOREIGN PATENT DOCUMENTS

| | | |
|---|---|---|
| 325019 | 9/1920 | Fed. Rep. of Germany ...... 464/175 |
| 1475845 | 2/1972 | Fed. Rep. of Germany. |
| 1415005 | 10/1964 | France. |
| 631727 | 11/1978 | U.S.S.R. .................. 251/335.3 |
| 181531 | 6/1922 | United Kingdom .................. 464/175 |
| 1208819 | 10/1970 | United Kingdom. |
| 1336130 | 11/1973 | United Kingdom .................. 403/50 |
| 2046373A | 11/1980 | United Kingdom. |
| 2146713A | 4/1985 | United Kingdom. |

*Primary Examiner*—Allan N. Shoap
*Attorney, Agent, or Firm*—Skjerven, Morrill, MacPherson, Franklin & Friel

[57] ABSTRACT

To set up sealing between two parts, having the possibility of relative rotation to a limited extent around a determined axis, a concertina element is used. This concertina element has two rigid, end tubular sections, fixedly joined in an impervious way with respective zones of each of said parts and an intermediate tubular part between said end tubular sections, and is capable of changing shape under torsion around said axis, to an extent that is at least equal to said extent. Thus, all risks of leakage between the two parts are removed.

4 Claims, 3 Drawing Sheets

FIG_4
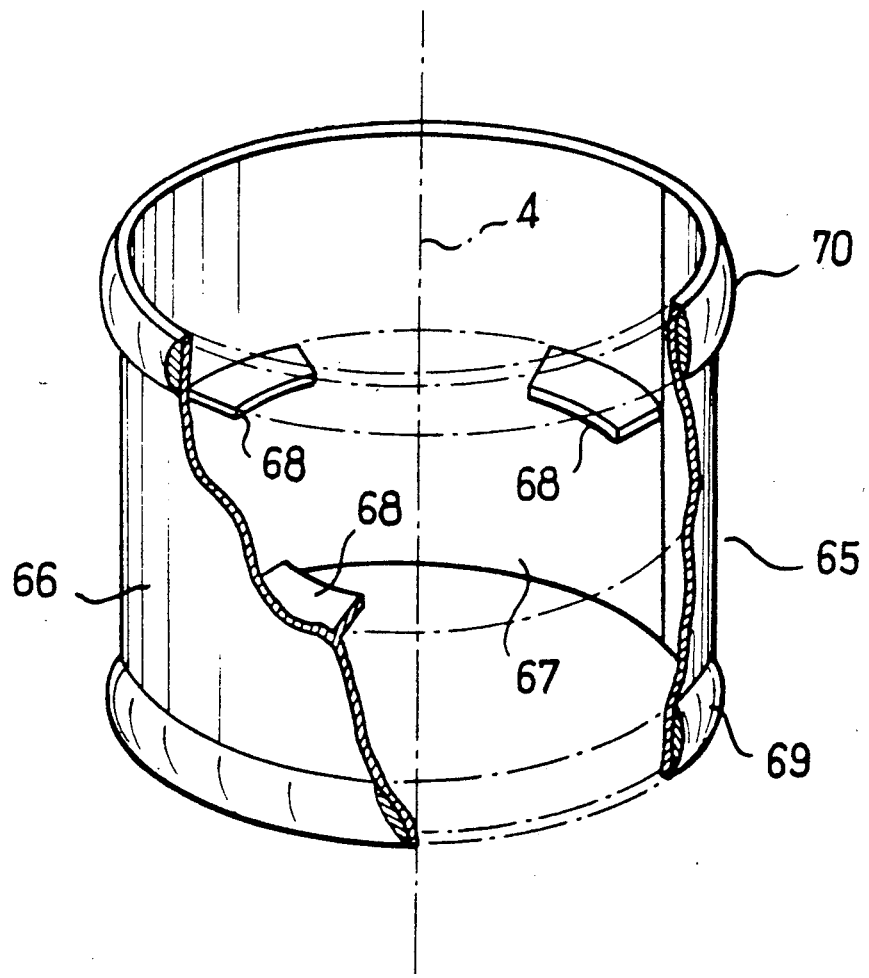

SEALING DEVICE DESIGNED TO ACHIEVE SEALING BETWEEN TWO PARTS HAVING A POSSIBILITY OF RELATIVE ROTATION TO A LIMITED EXTENT

BACKGROUND OF THE INVENTION

1. Field of the Invention

The present invention concerns a sealing or imperviousness creating device designed to achieve sealing or imperviousness between two elements or parts capable of relative rotation to a limited extent around a determined axis, and having respective annular zones that surround said axis and ar mutually offset along said axis.

As a non-restrictive example of such parts, we might cite a ball valve body having a bore with a determined axis and a shaft to open and shut this valve, engaged coaxially in this bore and being capable of rotating by a quarter turn or by a third of a turn with respect to the body in this bore.

2. Description of the Prior Art

The conventional way to seal such parts off from each other is to use a stuffing box having at least one packing that is fixedly joined to the first of these parts, namely the valve body in the above example, and is in sliding contact with the second one of these parts, namely the control shaft in this example, to permit a relative rotation at this contact.

Stuffing boxes such as this are subject to leakages at the contact between the packing and the second part, even if a high pressure of contact with this part is applied to the stuffing box.

SUMMARY OF THE INVENTION

The aim of the present invention is to overcome this drawback and, to this effect, the present invention proposes a sealing device designed to achieve sealing between two parts having a possibility of relative rotation to a limited extent around a determined axis and having respective annular zones that surround said axis and are mutually offset along this axis, such as a body having a bore with a determined axis and a shaft engaged coaxially in said bore, wherein said sealing device comprises a tubular sealed bellows element or bellows element, hereinafter called a bellows element, substantially coaxially surrounding said axis between said zones, and wherein said bellows element comprises:

- two end tubular sections that are rigid and joined fixedly and imperviously, respectively to one of said zones and to the other of said zones, and
- an intermediate tubular section, between said end tubular sections, that has two ends fixedly joined, respectively, to one of said end tubular sections and to the other of said end tubular sections and is capable of changing shape or getting deformed under torsion by relative rotation of said ends, around said axis, to an extent at least equal to said limited extent.

The tubular bellows element itself is sealed and the efficient sealing of the fixed connection of each of its end sections with the respectively corresponding part presents no difficulties and may result, for example, from soldering or welding if the materials used for the bellows element and the two parts between which it is designed to provide sealing are suited to it, so much so that the device according to the invention efficiently provides for sealing even against high pressures.

Nevertheless, through the capacity of its intermediate section to change shape under torsion, the bellows element of the sealing device according to the invention does not counter the relative rotation of the two parts between which it provides for sealing, in view of the limited extent of this rotation.

To this effect, it is possible to envisage several embodiments of the bellows element in its intermediate section. According to one preferred method of implementing the present invention, particularly well suited to an embodiment of the bellows element made of metal or metal alloy, for example a steel possessing heavy-duty mechanical characteristics with structural hardening, making it possible to obtain both high resistance to pressure and high resistance to fire, at least the intermediate section of the bellows element is formed by a tubular wall having a general shape generated by revolution around the axis of relative rotation of the two parts and, at least in a first axially located section of said intermediate section, and possibly on the totality of this intermediate section, said wall is undulated in at least one helix having said axis as its axis, so as to be capable of changing shape under torsion around this axis. Naturally, the length, pitch and angle of the helix as well as its external and internal diameters are chosen as a function of the maximum extent of relative rotation between the two parts, as also are the thickness of the wall and the material constituting this wall, which are also chosen as a function of the conditions of pressure and temperature that the bellows element has to withstand. To reduce the stiffness of this bellows element, that is, to reduce the hindrance to the relative rotation of the two parts to the minimum, it is possible to provide for said wall to be undulated in a plurality of mutually imbricated helices having the same axis, the same direction and the same pitch. Again, to this effect, it is possible to provide, in at least one second axially located section of said intermediate section of the bellows element, for said wall to be undulated in at least one ring of a shape generated by revolution around said axis, so as to be capable of changing shape along this axis. For example, if the first helically undulated helix is a single one, it is possible to provide for two of these second sections, each of which is then interposed between the first section of the intermediate section of the bellows element and each of its two end sections respectively. It is also possible to provide for only one second section of this type, namely a section with its wall undulated in at least one ring of a shape generated by revolution around the axis, to be interposed between two first sections, the wall of which is helically undulated, these two first sections themselves being connected to the end sections of the bellows element either directly- or also by means of respective second sections, the wall of which is undulated along at least one ring of a shape generated by revolution around the axis.

Preferably, the bellows element is made as a single piece but, notably, should the maximum extent of relative rotation between the two parts necessitate a great length of this bellows element along the axis, this bellows element can also be made by mutual, fixed assembly of several tubular sections, for example assembled mutually by soldering or welding if the material constituting these different sections is suited thereto.

The bellows element thus formed may be left free to change shape, during the relative rotation of the two parts, between its two end sections, but it is also possible to provide for it to be guided from the outside so as to prevent any great deformation by buckling when it is being torsionally wound as a result of this relative rotation.

To this effect, there is provision for means for coaxial guidance of the wall of the intermediate section of the bellows element. These coaxial guidance means include, for example, a rigid tubular sleeve coaxially surrounding said wall in demarcating, around this wall, an annular clearance of a shape generated by revolution around said axis, at least one annular skid with a shape generated by revolution around said axis, interposed between said wall and said sleeve and being in sliding contact with said sleeve, and means to hold said skid against a movement along said axis with respect to said wall. In a particularly simple way, these holding means may include at least one annular groove with a shape generated by revolution around said axis, prepared in said wall facing the sleeve, and least three lugs equally distributed around said axis and fixedly borne by said skid, said lugs being fitted into said groove. Preferably, the tubular sleeve is fixedly joined to one of said parts.

Other characteristics and advantages of a sealing device according to the present invention will emerge from the following description, pertaining to two non-restrictive exemplary embodiments, as well as from the appended drawings which form an integral part of this description.

BRIEF DESCRIPTION OF THE DRAWINGS

FIG. 4 is a perspective view of the part 65 shown in FIG. 3.

Naturally, although the bellows element that is characteristic of the sealing device according to the invention is described in an application to the setting up of relative sealing of a body of a ball valve and a shaft that controls the opening and shutting of this valve, those skilled in the art will easily understand that a bellows element such as this is open to other applications without the scope of the present invention being thereby exceeded in any way.

DETAILED DESCRIPTION OF PREFERRED EMBODIMENTS

Figure 2:
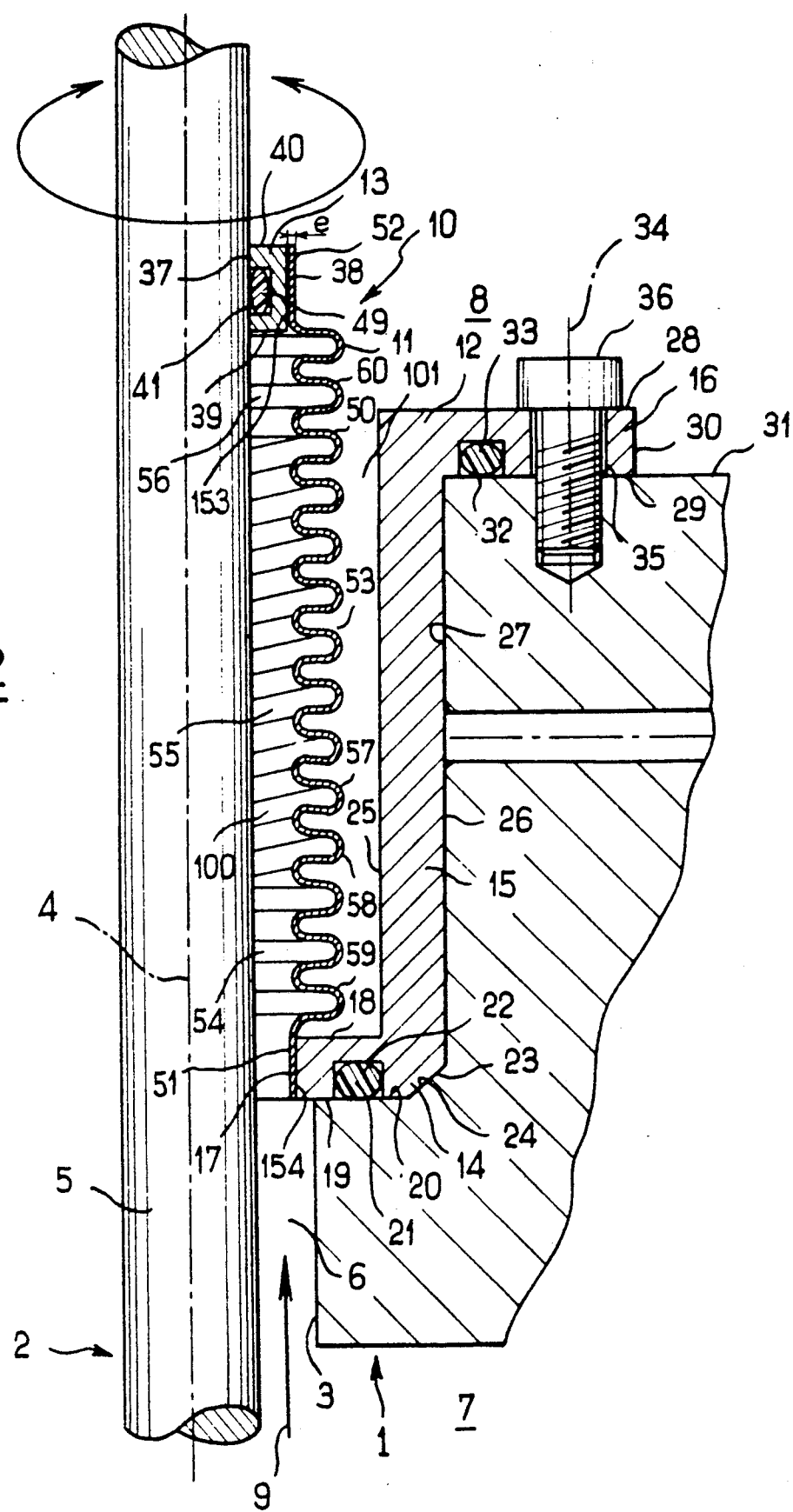
FIG. 2, shows a sectional view of the application of this bellows element to the setting up of sealing between a ball valve body and a shaft to control the opening and shutting of this ball valve, in a half plane demarcated by the common axis of the control shaft and of the bore that receives it for relative rotation in the body.

Reference shall be made firstly to FIG. 2, where 1 designates the valve body and 2 designates the shaft that controls the opening and shutting of this valve. Said shaft 2 goes through a wall of the body 1 by a bore 3 having a cylindrical shape generated by revolution around an axis 4, around which the shaft 2 is demarcated by an external peripheral face 5 with a cylindrical shape generated by revolution around this axis. By any appropriate means, known per se and not shown, the shaft 2 is guided in rotation around the axis 4, inside the bore 3, with respect to the body 1, without any other possibility of relative movement, and the extent of this rotation is restricted, for example, to a quarter turn or to one-third of a turn. This corresponds, for example, to a passing from the open position of the valve to its shutting position, and vice versa. Naturally, these figures are indicated by way of a non-restrictive example, it being understood that a sealing device according to the invention will find application generally speaking, provided that the parts which it has to seal off from each other are not liable to rotate indefinitely with respect to each other, i.e. that their relative rotation is restricted to a maximum of some turns, and preferably of less than one turn, in one direction and then in the other.

Between the external peripheral face 5 of the shaft 2 and the bore 3 of the body 1, there remains a continuous annular clearance 6, with a shape generated by revolution around the axis 4. The fluid under pressure, which should be let through or prevented from going through by the valve, depending on whether this valve is open or shut, tends to pass through the clearance 6 from the interior 7 of the valve towards its exterior 8, as shown schematically in FIG. 2 by an arrow 9 parallel to the axis 4.

This passage of fluid is countered by the sealing device 10 according to the invention, which shall now be described with reference to FIGS. 1 and 2.

In the non-restrictive example of the implementation of the invention, illustrated in these figures, the device 10 according to the invention is formed by the imperviously sealed assembly of three main parts, which are themselves sealed, namely the bellows element 11 capable of changing shape and two rigid, intermediate parts 12, 13, which are used for its sealed and rigid mounting, respectively on the body 1 and on the shaft 2 and have, to this end, respective general shapes generated by revolution around the axis 4.

To this effect, the intermediate mounting part 12 has three zones 14, 15, 16 which come after one another in this order in the direction of the arrow 9 and shall now be described. The zone 14 takes the form of a flange perpendicular to the axis 4. Towards this axis 4, the zone 14 is demarcated by a face 17 with a cylindrical shape generated by revolution around this axis, with a diameter that is intermediate between the respective diameters of the external peripheral face 5 of the shaft 2 and the bore 3 of the body 1. Respectively in the direction of the arrow 9 and in the reverse direction, the zone 14 is demarcated by two plane annular faces 18, 19 which are perpendicular to the axis 4 and are connected to the face 17 in the direction approaching this axis 4. Whereas the face 18, as will be seen in the rest of the description, is totally exposed towards the exterior 8 of the body of the valve 1 and is consequently subjected to the ambient pressure, the face 19 is exposed to the pressure prevailing in the interior 7 of the body i, in an annular zone, in between the face 17 of the zone 14 and the bore 3, and is also placed in close contact with a plane annular face 20 that has a shape generated by revolution around the axis 4 and is pointed in the direction taken by the arrow 9, and is designed to be on the body 1 all around the bore 3. The face 19 is sealed off from the face 20 by any appropriate means, taking into account a relative fixedness of these two faces when the device according to the invention is in service. That is, in the non-restrictive example illustrated, it is sealed off by an 0-ring seal 21 engaged in an annular groove 22 of the face 19. In the direction away from the axis 4, the faces 18 and 19 are connected, respectively directly and by means of a truncated face 23 which converges in the reverse direction to that of the arrow 9 and is placed in contact with a complementary truncated face 24 of the body 1, to respective faces 25 and 26 of the zone 15 of the part 12 These faces 25 and 26 are of a cylindrical shape generated by revolution around the axis 4 and are respectively pointed towards this axis and away from it. The zone 15 thus has the form of a sleeve parallel to the axis 4, surrounding this axis. With respect to this sleeve, the zone 14 forms an annular projection towards this axis 4. The face 26 is placed in contact with a complementary face 27 of the body of the valve 1 whereas, as will emerge in the rest of the description, the face 25 is exposed to the ambient pressure on the exterior 8 of the body 1. In the direction taken by the arrow 9, opposite their connection with the respectively corresponding faces of the zone 14, the faces 25 and 26 of the zone 15 of the part 12 are connected to respective faces 28, 29 of the zone 16, which are annular, plane, perpendicular to the axis 4 and respectively pointed in the direction taken by the arrow 9 and in the opposite direction. Thus, between the faces 28 and 29, the zone 16 has the shape of an annular flange projecting from the zone 15, away from the axis 4. In this direction, it is demarcated by a cylindrical face 30. The faces 28 and 30 are exposed to ambient pressure, on the exterior 8 of the valve body 1 while the face 29 is applied against a face 31 of this body 1. This face is plane, perpendicular to the axis 4 and pointed in the direction taken by the arrow 9, and borders the face 27 opposite the connection of this face 27 with the face 24. Imperviousness is provided between the faces 29 and 31 by any appropriate means and, for example, by an 0-ring seal 32 housed in an annular groove 33 hollowed out in the face 29. Between this annular groove 33 and the face 30, the zone 16 of the part 12 is drilled, along respective axes 34 parallel to the axis 4, with several bores 35 through which bolts 36, screwed into the body 1, go from one side to the other of the zone 16 to fixedly join the part 12 with the body 1 and to compress the 0-ring seals 21 and 32 respectively against the faces 20 and 31.

As for the part 13, offset in the direction taken by the arrow 9 with respect to the zone 14 of the part 12, it has the shape of a ring demarcated respectively towards the axis 4 and away from it, by a cylindrical face 37 having substantially the same diameter as the external peripheral face 5 of the shaft 2, and by a cylindrical face 38, having a diameter in between that of the faces 5 and 17, and more precisely a diameter equal to that of the face 17 minus a value e which, as will be seen further below, corresponds to a wall thickness of the bellows element 11. The two faces 37 and 38 are mutually connected by plane, annular faces 39, 40, perpendicular to the axis 4. The first of these faces 39, 40, pointed in the direction opposite to the direction 9, is exposed to the pressure prevailing in the interior 7 of the valve body 1 while the second face, pointed in the direction taken by the arrow 9, is exposed to the pressure prevailing on the exterior 8 of this body 1. By its face 37, the part 13 is fixedly and imperviously joined to the shaft 2, for example by being tightly pressed on and imprisoned in an 0-ring seal 41 housed in an annular groove 49 hollowed out in the face 37 or, again, by soldering or welding.

Those skilled in the art will easily understand that the modes just described for making fixed joints, with sealing, between the parts 12 and 13 and, respectively, the body 1 of the valve and shaft 2 for controlling the opening and shutting of this valve are but non-restrictive examples. Other means could be chosen to this effect without the scope of the invention being thereby exceeded in any way. Similarly, those skilled in the art will easily understand that the intermediate mounting part between the bellows element 11 and the two parts such as the valve body 1 and the control shaft 2, which it is designed to seal off from each other, can be dispensed with whenever this is compatible firstly with the shape and with the constituent materials of the body 1 and the shaft 2 and, secondly, with the requirements of assembly and dismantling during the fabrication of the valve and its maintenance In order to seal the interior 7 of the valve body 1 off from the exterior 8 of this body, the flange shaped zone 14 of the intermediate mounting part 12 and the intermediate mounting part 13, or again the respective zones of the valve body 1 and the control shaft 2, mutually offset with reference to the axis 4, as are this zone 14 and this part 13, are imperviously connected to each other by the bellows element 11, capable of changing shape This bellows element 11 is formed by an impervious tubular wall 50 surrounding the shaft 2 in a substantially coaxial way, notably within the sleeve-shaped zone 15 of the intermediate mounting part 12, with a general shape generated by revolution around the axis 4. This wall 50 is imperviously and fixedly joined respectively to the face 17 of the flange-shaped zone 14 and to the face 38 of the intermediate mounting part 13, for example by seal welding or soldering, as is seen in FIG. 2.

Figures 1, 3:
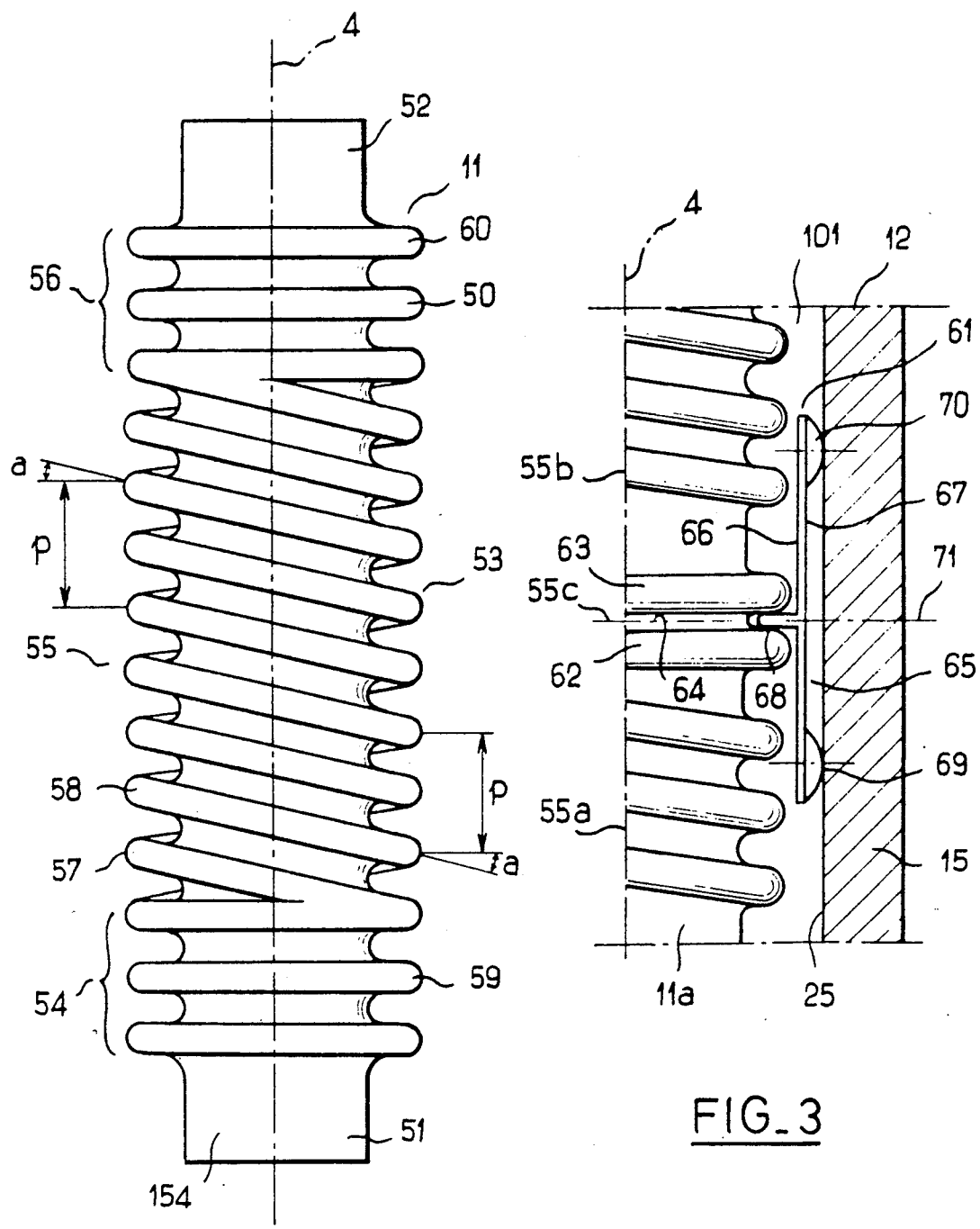
FIG. 1 shows a side view of a bellows element of a sealing device according to the invention.
FIG. 3 illustrates a detail of an alternative embodiment of the bellows element illustrated in FIGS. 1 and 2, seen in half, partly in a side view and partly in a sectional view along a plane including the common axis of the control shaft and of the bore receiving this shaft in the body.

As can be seen in FIGS. 1 and 2, the wall 50 of the bellows element 11 has, to this effect, two end sections 51, 52, respectively demarcated towards the axis 4 and away from it by faces 153, 154 with a cylindrical shape generated by revolution around the axis 4 with diameters that are substantially identical, respectively, to that of the face 38 of the intermediate mounting piece 13 and to that of the face 17 of the zone 14 of the intermediate mounting piece 12, to get applied closely, respectively against this face 38 and against this face 17 and to thus facilitate a mutual, sealed, fixed joining, for example by soldering or welding.

The end sections 51, 52 of the wall 50 of the bellows element 11 are rigid either inherently or because they are fixedly joined with the zone 14 of the rigid part 12 and with the rigid part 13 respectively.

Between the end sections 51 and 52, and over a major part of its length measured parallel to the axis 4, the bellows element 11 has an intermediate section 53 which itself has three sections 54, 55, 56 succeeding one another in this order in the direction taken by the arrow 9, from the end section 51 to the end section 52. The section 54 connects this end section 51 to the section 55 at one of the ends of the intermediate section 53, and the section 56 connects the end section 52 to the section 55 at the other end of the intermediate section 53.

In the section 55 which itself has, parallel to the axis 4, a length corresponding to the major part of the length of the bellows element 11, measured from its end section 51 to its end section 52 parallel to the axis 4, the wall 50 is undulated in two mutually imbricated helices 57, 58 with an axis 4. To this effect, the two helices 57 and 58 have the same pitch p, the same direction and the same angle a, and each turn of the one is placed at mid-distance between two turns of the other. However, the scope of the present invention would not be exceeded if there were provision for only one helix or for more than two mutually imbricated helices, with the same pitch, the same direction and the same angle, in the section 55 of the intermediate section 53 of the bellows element. When there is provision for several mutually imbricated helices, these helices may be mutually identical, as is the case in the example shown, or again they may be different, provided that they have the same pitch, the same direction and the same angle.

The undulated, helical character of the wall 50 in the section 55 facilitates a changing of shape of this section 55 under torsion around the axis 4, in order to permit a relative rotation, around this axis, of the two end sections 51 and 52 and, with them, of the intermediate mounting parts 12 and 13, without deterioration of the wall 50, this relative rotation being permitted to an extent that is, of course, limited but in any case at least equal to the maximum extent to which the control shaft 2 should rotate on the axis 4 with respect to the body 1 during the passage from the opening position of the valve to its closing position, and vice versa.

The dimensional characteristics of the section 15 are chosen notably as a function of this extent.

It will be noted that according to a simpler mode of implementation, not shown, of the present invention, the section 55 in which the wall 50 is helically undulated could extend from either one of the end sections 51 and 52 to the other. However, the fact that the end sections 51 and 52 cannot move with respect to each other along the axis 4 obliges this section 55 to apply both torsional stress around the axis 4 and tensile/compressive stress parallel to this axis, during the relative rotation of the two end sections 51 and 52.

In the case of the mode of implementation of the invention that has been illustrated, on the contrary, the torsional stress, which is exerted essentially at the section 55, is dissociated from the tensile/compressive stress which, for its part, is exerted essentially at the sections 54 and 56 of the intermediate section 53 of the bellows element 11.

To this effect, at each of the two sections 54 and 56, which are identical in the example shown, the wall 50 is undulated not helically as at the section 55 but in the form of at least one ring 59, 60 with a shape generated by revolution around the axis 4. In the example illustrated, each of the two sections 54 and 56 has three respective undulation rings 59, 60. Naturally, the scope of the invention would not be exceeded in providing for a different number of rings at each of the sections 54 and 56 or again in making a different arrangement, in the intermediate section 53 of the bellows element, of one or more sections that are more particularly designed to change shape along the axis 4 and are, for example, undulated in at least one ring of a shape generated by revolution around this axis, as are the sections 54 and 56 of the embodiment described For example, the wall 50 could be helically undulated in two sections that are directly adjacent, respectively, to each of the end sections 51 and 52 and would have, interposed between them, a section in which the wall 50 would be undulated in one or more rings of shapes generated by revolution around the axis 4.

In general, the shape of the bellows element 11 that has just been described is but a non-restrictive example for which it is possible to provide for a great many variants that do not go beyond the scope of the present invention, notably as regards the shaping of its wall 50 in its intermediate section 53 in order to enable the relative rotation, to a limited extent, of its end sections 51 and 52.

It will be noted that, to preserve the freedom of deformation of the bellows element 11 during this relative rotation, notably when it is at rest, as illustrated in FIGS. 1 and 2 in one of the relative positions of the shaft 2 and of the body 1, this bellows element 11 is not in contact by any of the undulations of its intermediate section 53 with the face 5 of the shaft 2 or with the face 25 of the sleeve-shaped zone 15 of the intermediate mounting part 12: in other words, there remains a continuous annular clearance 100, with a general shape generated by revolution around the axis 4, between the face 5 of the shaft 4 and the bellows element 11, from its end section 154 by which this clearance communicates with the interior 7 of the body 1 to the intermediate mounting part 13 which, with the bellows element 11, isolates this clearance 100 from the exterior 8, and there also remains a continuous annular clearance 101, with a general shape generated by revolution around the axis 4, between the bellows element 11 and the face 25 of the sleeve-shaped zone 15, this clearance 101 communicating with the exterior 8 of the body 1 in being isolated from its interior 7 by the bellows element 11 and the flange-shaped zone 14 of the intermediate mounting part 12.

Furthermore, in the applications where there is a risk of buckling of the bellows element 11 and, consequently, a risk that this bellows element 11 might come into contact with the face 5 of the shaft 2 or with the face 25 of the sleeve-shaped zone 15 of the intermediate mounting part 12, with the risk of causing damage to the wall 50, it is possible to provide for means of coaxial guidance of the intermediate section 53, preferably on the exterior 8 of the valve body and, more precisely, in the clearance 101 remaining between the bellows element 11 and the face 25 of the sleeve-shaped zone 15 of the intermediate mounting part 12.

Guidance means such as these have been illustrated at 61 in FIG. 3 which also shows, in identical fashion, the sleeve-shaped zone 15 of the intermediate mounting part 12, notably with its face 25 pointed towards the axis 4 and a bellows element 11a identical to the bellows element 11 except that the single section 55 is replaced by two sections 55a and 55b similar in all respects to the section 55, notably as regards the undulation of the wall of the helical bellows element: the two sections 55a and 55b have approximately the same length along the axis 4 and are respectively adjacent to the section 54 and to the section 56 (not shown). They are connected two by two by a section 55c in which the wall of the bellows element 11a forms, by undulation, two ribs 62 and 63 having an annular shape generated by revolution around the axis 4 and projecting away from the axis 4 to demarcate, between them and outside the bellows element, a groove 64 which also has an annular shape generated by revolution around this axis 4. It will be seen that the two projections 62 and 63 keep to the above-mentioned clearance 101 from the face 25 of the sleeve-shaped zone 15 of the intermediate mounting part 12.

The groove 64 and the two annular undulations 62 and 63 form holding means against a movement parallel to the axis 4, with respect to the bellows element 11a, of a part 65 forming at least one annular skid with a shape generated by revolution around the axis 4, placed within the annular clearance 101 and coming into sliding contact with the face 25 of the sleeve-shape zone 15 of the intermediate mounting part 12. To this effect, the part 65, with a general shape generated by revolution around the axis 4, has two cylindrical faces 66 and 67 towards this axis as well as away from this axis. These two cylindrical faces 66 and 67 have respective diameters in between the maximum external diameter of the annular undulations 62 and 63 as well as of the helical undulations of the sections 55a and 55b and the diameter of the face 25, with dimensions, parallel to the axis 4, substantially smaller than the corresponding dimensions of the face 25 in such a way that the part 65 can neither come into contact with the face 18 of the flange-shaped zone 14 of the intermediate mounting part 12 nor go out of the clearance 101 towards the exterior 8 of the body 1 under normal conditions of use of the valve, namely of deformation of the bellows element 11a. Along one and the same plane 71 which is perpendicular to the axis 4 and forms a plane of symmetry for the entire part 65, this part 65 fixedly bears three retaining lugs 68 that project radially towards the axis 4 and are fitted into the groove 64, between the annular undulations 62 and 63 which thus work together with these lugs 68 to retain the part 65 against any movement parallel to the axis 4 with respect to the bellows element 11a. These holding lugs 68 are fixedly joined to the part 65. Furthermore, projecting from its face 67 towards the face 25 of the sleeve-shaped zone 15 of the intermediate mounting part 2, in positions that are mutually symmetrical with the plane 71, the skid-forming part 65 fixedly bears two annular skids 69 and 70, having a shape generated by revolution around the axis 4 and being placed in sliding contact with the face 25. A perspective view of part 65, showing lugs 68 and annular skids 69 and 70, is shown in FIG. 4. For reasons of assembly, the skid-forming part 65 may take, for example, the form of an elastic ring opened by a slot parallel to the axis 4. Other embodiments of the skid-forming part 65 could also be provided without the scope of the present invention being thereby exceeded in any way. Similarly, the number of parts such as this could be increased, if necessary, on the lengths of the intermediate section 53 of the bellows element 11 parallel to the axis 4.

Naturally, whether it has one of the two above-described shapes or other shapes, the characteristic bellows element of the sealing device according to the invention may be made of a very great variety of materials by the methods appropriate to these materials, chosen notably as a function of the temperature to which it has to be subjected under operation, as well as the difference in pressure between the interior 7 and the exterior 8 which it is likely to be called upon to withstand.

It is possible, notably, to consider the making of a bellows element according to the invention by the molding of a plastic or similar material.

However, for making this bellows element, it is also possible to envisage the use of materials that are far more rigid in principle, wherein the undulations of the intermediate section 53 of this bellows element nevertheless permit the changing of shape, notably under torsion to a limited extent. Such materials could be, for example, metals or metal alloys, and notably steels with heavy-duty mechanical characteristics and structural hardening, obtained by thermal treatment, preferably under vacuum to prevent oxidation.

For example, in a case such as this, the bellows element may be made with a tube that is formed hydraulically or by drawing, using a rubber chuck, in a die formed by two assembled halves.

Preferably, the bellows element is made in a single piece but it can also be made by the mutual sealed assembly of several sections which may or may not correspond to the above-mentioned sections 51, 52, 53, 54, 55, 56, 55a, 55b, 55c. In a case such as this, when the bellows element is made of metal or of metal alloy, it is possible to shape each of the sections of the bellows element by shaping a tube in a die consisting of two assembled halves, as stated above, and then to weld or solder these different sections, which are then released from stresses by a treatment such as a hyper-hardening treatment before applying the structural hardening heat treatment.

Naturally, the choice of the materials used to make the bellows element of a sealing device as well as the choice of the shape and dimensional characteristics of this bellows element lie within the normal capabilities of those skilled in the art, taking into account the conditions of temperature and pressure in which the bellows element should work, the nature of the fluids that it has to isolate mutually and imperviously, and the limited extent of relative rotation of the parts such as the body of the valve 1 and the control rod 2 between which it has to set up sealing.

What is claimed is:

1. A sealing device designed to achieve sealing between two parts capable of relative rotational motion to a significant but limited extent around an axis, said parts having respective annular zones surrounding said axis and being separated from each other along said axis, wherein said sealing device comprises:

a bellows element substantially coaxially surrounding said axis, said bellows element having two ends joined and sealed to said two annular zones, respectively, and being capable of changing shape under torsion caused by the relative rotation of said two annular zones around said axis to said significant but limited extent; and guidance means for preventing said bellows element from buckling in the presence of said relative rotation between said zones, wherein said guidance means includes a rigid tubular sleeve coaxially surrounding said bellows element and defining an annular clearance between said sleeve and said bellows element;

means for maintaining said annular clearance between said sleeve and said bellows element, said means being interposed between said bellows element and said sleeve and being in sliding contact with said sleeve; and means to restrain said means for maintaining said annular clearance from longitudinal movement along said axis with respect to said bellows element.

2. A sealing device designed to achieve sealing between two parts capable of relative rotational motion to a significant but limited extent around an axis, said parts having respective annular zones surrounding said axis and being separated from each other along said axis, wherein said sealing device comprises:

a bellows element substantially coaxially surrounding said axis, said bellows element having two ends joined and sealed to said two annular zones, respectively, and being capable of changing shape under torsion caused by the relative rotation of said two annular zones around said axis to said significant but limited extent; and guidance means for preventing said bellows element from buckling in the presence of said relative rotation between said zones, wherein said guidance means includes a rigid tubular sleeve coaxially surrounding said bellows element and defining an annular clearance between said sleeve and said bellows element;

at least one annular skid interposed between said bellows element and said sleeve and being in sliding contact with said sleeve; and means to restrain said skid from longitudinal movement along said axis with respect to said bellows element.

3. A device according to claim 2, wherein said restraint means includes at least one annular groove in said bellows element facing said sleeve, and at least three lugs distributed at equal angular distances around said axis and mounted on said skid, said lugs being fitted into said groove.

4. A device according to claim 2, wherein said tubular sleeve is joined to one of said parts.

* * * * *